United States Patent
Schimbäck

(10) Patent No.: US 12,139,778 B2
(45) Date of Patent: *Nov. 12, 2024

(54) ALUMINIUM-NICKEL ALLOY FOR MANUFACTURING A HEAT CONDUCTING PART, SUCH AS A HEAT EXCHANGER

(71) Applicant: Airbus SAS, Blagnac (FR)

(72) Inventor: David Schimbäck, Taufkirchen (DE)

(73) Assignee: AIRBUS SAS, Blagnac (FR)

(*) Notice: Subject to any disclaimer, the term of this patent is extended or adjusted under 35 U.S.C. 154(b) by 0 days.

This patent is subject to a terminal disclaimer.

(21) Appl. No.: 17/902,186

(22) Filed: Sep. 2, 2022

(65) Prior Publication Data

US 2023/0094523 A1 Mar. 30, 2023

(30) Foreign Application Priority Data

Sep. 30, 2021 (EP) .................................. 21200292

(51) Int. Cl.
| | | |
|---|---|---|
| C22C 21/00 | (2006.01) | |
| B22F 10/28 | (2021.01) | |
| B22F 10/64 | (2021.01) | |
| B33Y 10/00 | (2015.01) | |
| B33Y 40/20 | (2020.01) | |
| B33Y 70/00 | (2020.01) | |
| C22F 1/04 | (2006.01) | |
| F28F 21/08 | (2006.01) | |
| B33Y 80/00 | (2015.01) | |

(52) U.S. Cl.
CPC .............. *C22C 21/00* (2013.01); *B22F 10/28* (2021.01); *B22F 10/64* (2021.01); *B33Y 10/00* (2014.12); *B33Y 40/20* (2020.01); *B33Y 70/00* (2014.12); *C22F 1/04* (2013.01); *F28F 21/084* (2013.01); *B22F 2301/052* (2013.01); *B33Y 80/00* (2014.12)

(58) Field of Classification Search
None
See application file for complete search history.

(56) References Cited

U.S. PATENT DOCUMENTS

| | | |
|---|---|---|
| 5,597,529 A | 1/1997 | Tack |
| 9,725,790 B2 | 8/2017 | Palm |
| 2004/0170522 A1 | 9/2004 | Watson |
| 2013/0312876 A1 | 11/2013 | Palm |
| 2017/0165795 A1 | 6/2017 | Lenczowski |
| 2017/0298477 A1 | 10/2017 | Palm |
| 2020/0140976 A1 | 5/2020 | Mann et al. |
| 2020/0360993 A1 | 11/2020 | Opprecht et al. |
| 2020/0362440 A1 | 11/2020 | Rometsch et al. |

FOREIGN PATENT DOCUMENTS

| | | | |
|---|---|---|---|
| CN | 102952956 A | | 3/2013 |
| CN | 104946937 A | * | 9/2015 |
| CN | 105781605 A | | 7/2016 |
| CN | 107058831 A | | 8/2017 |
| CN | 108130451 A | | 6/2018 |
| CN | 109047783 A | | 12/2018 |
| CN | 110791686 A | | 2/2020 |
| CN | 111218586 A | | 6/2020 |
| DE | 102007018123 A1 | | 10/2008 |
| DE | 102007018123 B4 | | 10/2008 |
| DE | 102010053274 A1 | | 6/2012 |
| EP | 2646587 B1 | | 10/2013 |
| EP | 3181711 A1 | | 6/2017 |
| JP | 09279280 A | * | 10/1997 |
| JP | H09279280 A | | 10/1997 |
| JP | 2000119786 A | | 4/2000 |
| WO | 2018236241 A1 | | 12/2018 |
| WO | 2019109135 A1 | | 6/2019 |

OTHER PUBLICATIONS

Sankanit, P., V. Uthaisangsuk, and P. Pandee, Tensile properties of hypoeutectic Al-Ni alloys: Experiments and FE simulations. Journal of Alloys and Compounds, 2021. 889. (Year: 2021).*
European Search Report; priority document.
German Search Report for corresponding German Patent Application No. 102020131823.5 dated Jul. 8, 2021.

(Continued)

*Primary Examiner* — Anthony M Liang
(74) *Attorney, Agent, or Firm* — Greer, Burns & Crain, Ltd.

(57) ABSTRACT

An alloy formed of aluminum, nickel, scandium and optionally one, two or more further metals. The aluminum alloy is suitable for additive manufacturing of lightweight highly thermally conductive components for aircraft, such as heat exchangers. In a first step, a powder of the described aluminum alloy is produced by additive manufacturing, such as laser melting in the L-PBF process. Large grains are able to grow epitaxially along the build direction thereby increasing phonon and electron mobility along the build direction. With this, a higher thermal conductivity can be achieved. In a second step, the preliminary part is hardened by precipitation of secondary phases at 250 to 400 C to form the hardened part. 3D-printed lightweight parts with high thermal conductivity are obtained.

9 Claims, No Drawings

(56) References Cited

OTHER PUBLICATIONS

A.J. Bosch, et al., "Nanostructured and High-Strength Alloys: Sclamalloy—a Unique High Strength and Corrosion Insensitive AlMgScZr Material Concept" ICAA—International Conference on Aluminium Alloys, Sep. 22-26, 2008; Aachen, Germany, vol. 2, pp. 2215-2223.

European Search Report for corresponding European Patent Application No. 21210643.9 dated Apr. 5, 2022.

Wikipeadia, Heats of Vaporization of the Elements retrieved on Oct. 20, 2021 from https://en.wikipedia.org/w/index.php?title=Heats_of_vaporization_of_the_elements_(data_page)&oldid=1050974181.

A. V. Krainikov et al., "Sintered Metals and Alloys—Rapidly Solidfied High-Temperature Aluminum Alloys. II. Mechanical Properties" Powder Metallurgy and Metal Ceramics, vol. 51, Nos. 9-10, Jan. 2013.

* cited by examiner

ALUMINIUM-NICKEL ALLOY FOR MANUFACTURING A HEAT CONDUCTING PART, SUCH AS A HEAT EXCHANGER

CROSS-REFERENCES TO RELATED APPLICATIONS

This application claims the benefit of the European patent application No. 21200292.7 filed on Sep. 30, 2021, the entire disclosures of which are incorporated herein by way of reference.

FIELD OF THE INVENTION

The invention relates to an aluminum alloy. The invention relates further to a method for additive manufacturing using the aluminum alloy and a manufactured part, preferably a heat conducting part, such as a heat exchanger, for an aircraft.

BACKGROUND OF THE INVENTION

It is noted that throughout this disclosure the expression "wt %" means "percentage by weight".

DE 10 2007 018 123 B4 discloses an aluminum-scandium (AlSc) alloy suitable for rapid prototyping methods. The mass proportion of scandium is 0.4 wt % or higher.

EP 2 646 587 B1 discloses an aluminum-scandium-calcium (AlScCa) alloy that allows to combine lightweight construction due to lower density with improved tensile strength.

German patent application 10 2020 131 823.5 which is unpublished at the date of filing and does not form prior art according to Art. 54 (2) or (3) EPC discloses an aluminum-scandium-titanium (AlScTi) alloy that is improved for rapid heating and cooling as exhibited in additive manufacturing methods, such as laser powder bed fusion (L-PBF).

SUMMARY OF THE INVENTION

It is an object of the invention to provide an improved alloy having improved thermal and/or strength properties.

DETAILED DESCRIPTION OF THE PREFERRED EMBODIMENTS

The invention provides an aluminum (Al) alloy comprising:
  nickel (Ni) with a proportion from 0.1 wt % to less than 5.5 wt %;
  balance Al and unavoidable impurities with a total of less than 0.5 wt %; and
  optionally scandium (Sc) with a proportion from 0.1 wt % to 3.0 wt %;
  optionally at least one first additional alloy element that is suitable to complement or to substitute Sc, wherein an individual proportion of an individual first additional alloy element does not exceed 2.0 wt % and the total proportion of the first additional alloy elements does not exceed 3.0 wt %;
  optionally at least one second additional alloy element that is selected from a group consisting of vanadium (V), niobium (Nb), chromium (Cr), molybdenum (Mo), silicon (Si), iron (Fe), and cobalt (Co), wherein the individual proportion of an individual second additional alloy element does not exceed 2.0 wt % and the total proportion of the second additional alloy elements does not exceed 3.0 wt %;
  optionally at least one third additional ally element that is selected from a group consisting of magnesium (Mg), manganese (Mn), and calcium (Ca), wherein the individual proportion of an individual second additional alloy element does not exceed 2.0 wt % and the total proportion of the second additional alloy elements does not exceed 3.0 wt %.

Preferably, Ni has a proportion from 0.3 wt % to 5.5 wt %, more preferably from 0.5 wt % to 5.5 wt %, more preferably from 0.6 wt % to 5.5 wt %, more preferably from 1.0 wt % to 5.5 wt %, more preferably greater than 2.0 wt % to 5.5 wt %, more preferably from 2.1 wt % to 5.5 wt %, more preferably from 2.5 wt % to 5.5 wt %, more preferably greater than 2.5 wt % to 5.5 wt %, more preferably from 2.6 wt % to 5.5 wt %, more preferably from 2.6 wt % to 5.0 wt %, more preferably from 2.6 wt % to 4.0 wt %.

Preferably, Sc has a proportion from 0.1 wt % to 1.5 wt %, more preferably from 0.1 wt % to 1.0 wt %, more preferably from 0.1 wt % to 0.8 wt %, more preferably from 0.1 wt % to 0.7 wt %, more preferably from 0.1 wt % to 0.60 wt %, more preferably from 0.1 wt % to less than 0.55 wt %, more preferably from 0.1 wt % to 0.50 wt %.

Preferably, the first additional alloy element is chosen from a group consisting of zirconium (Zr), tantalum (Ta), hafnium (Hf), Yttrium (Y), and erbium (Er).

Preferably, the individual proportion of an individual first additional alloy element is from 0.1 wt % to 1.0 wt %, more preferably from 0.1 wt % to 0.7 wt %, more preferably from 0.1 wt % to 0.60 wt %, more preferably from 0.1 wt % to 0.55 wt %, more preferably from 0.1 wt % to 0.50 wt %.

Preferably, Zr is selected, and the individual proportion of Zr is below 0.3 wt %, more preferably below 0.2 wt %.

Preferably, the alloy is free of Zr. Preferably, the alloy is free of Ti. Preferably, the alloy is free of Mg. Preferably, the alloy is free of Ca.

Preferably, the alloy comprises Al, Ni, Sc, and Ca, wherein Ca has a proportion from 0.5 wt % to 5 wt %.

Preferably, the alloy comprises Al, Ni, Sc, and Cr, wherein Cr has a proportion from 0.2 wt % to 3 wt %, preferably from 0.5 wt % to 2.7 wt %.

Preferably, the alloy comprises Al, Ni, Sc, and Zr, wherein Zr has a proportion from 0.1 wt % to 0.5 wt %, preferably from 0.1 wt % to 0.2 wt %.

Preferably, the alloy comprises Al, Ni, Sc, Zr, and Ca, wherein Zr has a proportion from 0.1 wt % to 0.5 wt %, preferably from 0.1 wt % to 0.2 wt %, and wherein Ca has a proportion from 0.5 wt % to 5 wt %.

Preferably, the alloy comprises Al, Ni, Sc, Zr, and Cr, wherein Zr has a proportion from 0.1 wt % to 0.5 wt %, preferably from 0.1 wt % to 0.2 wt %, and wherein Cr has a proportion from 0.2 wt % to 3 wt %, preferably from 0.5 wt % to 2.7 wt %.

The invention provides an additive manufacturing method for manufacturing a preliminary part, preferably a heat conducting preliminary part, such as a preliminary heat exchanger, the method comprising:
  a) Forming a powder bed out of a powder layer that comprises or consists of metal powder made of a preferred alloy described above;
  b) Locally melting the powder layer immediately followed by solidification while globally heating the powder bed and/or the powder layer to a temperature from 200° C. to below the melting point of the metal powder, preferably to a temperature from 200° C. to 400° C.;

c) if the preliminary part is not finished, adding another powder layer on top of a previous powder layer and repeating steps b) and c) until the preliminary part is finished.

Preferably, the powder bed includes a build plate made of a single crystalline material that has a lattice constant allowing for epitaxial growth, wherein in step a) a first powder layer is deposited onto the build plate. Preferably, the single crystalline material is an aluminum alloy.

Preferably, the build plate is made of a preferred alloy described above. Preferably, the build plate is a single crystal. Preferably, the single crystal is oriented such that its <100>-direction is parallel to the direction in which the powder layers are built up.

Preferably, in step b) globally heating the powder bed is done by heating the build plate.

Preferably, the method further comprises:
d) after finishing the preliminary part, heating the preliminary part to a temperature from 200° C. to 450° C., preferably from 210° C. to 300° C., more preferably from 225° C. to 275° C., which transforms the preliminary part into a hardened part due to precipitation hardening.

The invention provides a heat conducting part or heat exchanger, preferably for an aircraft, wherein the heat conducting part or heat exchanger includes a portion that is made from a preferred alloy described above, or wherein the heat conducting part or heat exchanger is obtainable by a preferred method described above.

This invention deals with an improved manufacturing technique of a specific newly developed Al alloys (Al-xNi-ySc, whereas x and y defines wt % of the respective alloy element) in the field of additive manufacturing, with special regard toward improved thermal properties for heat exchanger applications at simultaneously sufficient strength levels. Especially for future mobility scenarios like zero emission aircraft or urban aerial mobility vehicles, the alloy and manufacturing technique, respectively, can enable lightweight structures for thermal applications.

Currently, additive manufacturing (AM) is a manufacturing technique that aims to suppress epitaxial grain growth. This is to allow isotropic material properties evolving from the non-epitaxial microstructure. On the other hand, coarse grains that basically form a quasi-single crystalline material with low grain boundary density are advantageous for better thermal properties. Grain boundaries are usually obstacles for so called phonons (lattice vibrations that are described as a quasi-particle in a quantum mechanical approach). The invention aims to reduce these obstacles for the quasi-particles, so as to improve thermal conductivity in the material. Next to the grain boundaries, solid solution hardening and incoherent precipitates may cause scattering of phonons and electrons, thereby impeding their migration.

As a result, there is a need for a new alloy that is capable of resolving this conflict of objectives. The aim of this disclosure is to favor epitaxial grain growth at least along one direction, by enabling the emergence of quasi-single crystal portions and combining the respective advantages with the design freedom of the AM process, e.g., for heat exchanger applications.

For heat exchangers materials a high thermal conductivity is important, especially for high performance heat exchangers with regard to future mobility concepts. This material property can be strongly influenced by the microstructure of the material, which compared to usual structures made from copper, for example, ultimately allows for more lightweight structure.

The AM process, such as L-PBF, as envisaged herein can be compared to some extent with the zone melting technique for manufacturing Si single crystals. Preferably, the substrate plate used is a single crystal Al alloy in order to stimulate a favored crystal growth direction such as the <100>-direction.

The adapted Al alloy preferably only contains alloying elements that do not exhibit high constitutional supercooling during solidification in order to suppress grain refinement (e.g., Al-1Ni-0.7Sc), which favors extraordinary grain growth along the manufacturing direction and allows a high strength alloy with a quasi-single crystal microstructure.

The global heating allows for directional solidification and supports the generation of elongated quasi-crystalline grains along the build direction. In contrast to the usual concepts, the grain growth restriction factor (GRF) is used in the opposite way. In other words, it is favorable according to the invention to epitaxially grow grains along a specific direction. Thus, elements having a low GRF are preferred. Elements that operate as a grain refiner are used only to the extent necessary for other advantageous properties, while avoiding a degree of grain refinement that is too high.

Furthermore, elements that may contribute to the strength of the alloy due to solid solution hardening should be avoided.

Precipitation of primary nano-sized coherent precipitates, such as Al3Ni or Al3Sc, should be avoided due to their gran refining properties. Primary precipitates are those emerging during solidification after initial heating.

Precipitation of secondary nano-sized coherent precipitates, such as Al3Ni or Al3Sc, is preferred. Secondary precipitates are those emerging during heat treatment.

In general, Al—Ni alloys exhibit a low GRF, leading to or at least allowing epitaxial grain growth across the weld layer. Due to the formation of coherent precipitates of Al3Ni, an increase of strength can be obtained but only a minor influence on electron or phonon migration is exhibited. In addition, there is almost no solid solubility. A small solidification temperature range is advantageous for avoiding hot cracking. Thus, the alloy is especially suitable for additive manufacturing, which has large heating and cooling rates associated with the process.

It is preferred to use Sc or complements or substitutes thereto, to increase the alloy strength due to precipitation hardening of nano-sized precipitates.

A) Method for Manufacturing Aluminum Alloys

Example 1: Manufacturing of Powdered Aluminum Alloys

In an inert crucible, 0.5 wt % Ni and 99.5 wt % Al are melted. The melt can be homogenized before further processing.

A first portion of the melt is poured into another inert crucible, where it cools and solidifies. During cooling, primary Al3Ni phases precipitate. The resulting material is crushed into a powder that can be used for selective laser melting in a powder bed.

A second portion of the melt is poured onto a rotating copper roll cooled with water in a melt spinning process. The melt cools at a rate of 1,000,000 K/s forming a strip. The ribbon is cut into short flakes.

The alloy material obtained from either or both cooling processes is reduced to a powder that can be used for selective laser melting in a powder bed.

Example 2: Manufacturing of Powdered Aluminum Alloys Having Different Nickel Content The above process is repeated with the proportion of Ni being increased to 0.6 wt %, 1.0 wt %, 2.1 wt. %, 2.6 wt %, 3.0 wt. %, 4.0 wt. %, 5.0 wt % and 5.45 wt. %, respectively, and the proportion of Al being reduced accordingly. It should be noted that the proportion of Ni is preferably increased close to but still below 5.5 wt % and the proportion of Al is reduced accordingly.

Example 3: Manufacturing of Powdered Aluminum Alloys Having Scandium as Additional Element The process of Example 1 or 2 is repeated with an additional 0.6 wt %, 0.7 wt %, 0.8 wt %, 1.0 wt %, 1.2 wt % and 1.5 wt % of Sc added to the crucible, respectively, wherein the content of Ni is kept constant and the proportion of Al is reduced accordingly.

Example 4: Manufacturing of Powdered Aluminum Alloys Having Additional Elements that Complement or Substitute Scandium The process of Example 1, 2, or 3 is repeated with an additional 0.1 wt %, 0.2 wt %, 0.3 wt %, 0.4 wt %, and 0.5 wt % of Zr added to the crucible, respectively, wherein the content of Ni and, if applicable, Sc is kept constant and the proportion of Al is reduced accordingly. Usually it is possible to add Ti instead of or in addition to Zr. However, due to its grain refining properties, it is preferred that the alloy is free of Ti.

Example 5: Manufacturing of Powdered Aluminum Alloys Having Magnesium and/or Calcium as Additional Elements The process of Example 1, 2, 3, or 4 is repeated with an additional 0.5 wt %, 1.0 wt %, 2.4 wt % and 5.0 wt % of Ca or Mg added to the crucible, respectively, wherein the content of Ni and, if applicable, Sc and Zr, is kept constant and the proportion of Al is reduced accordingly.

Example 6: Manufacturing of Powdered Aluminum Alloys Having Additionally Various Metals The process of Example 1, 2, 3, 4, or 5 is repeated with an additional 0.5 wt %, 1.4 wt %, 1.7 wt %, and 2.0 wt % of V, Nb, Cr, Mo, Si, Fe, Co, Ta, Hf, Y, or Er added to the crucible, respectively, wherein the content of Ni and, if applicable, Sc and Zr, is kept constant and the proportion of Al is reduced accordingly.

B) Method for Manufacturing a Part, Such as a Heat Conducting Part

In each case, an aluminum alloy powder from one of the above examples 1 to 6 is added to a system for additive manufacturing by selective laser melting, forming a powder bed. The powder bed includes a build plate that is made of a single crystal of aluminum alloy according to one of the above examples 1 to 6 or aluminum. The single crystal is oriented such that its <100>-direction follows the layer by layer build up.

The powder bed, specifically the build plate is heated to a temperature from 200° C. to below the melting point of the metal powder, preferably to a temperature from 200° C. to 400° C.

The laser beam is moved over the powder bed according to digital information, whereby the powder bed including the build plate is lowered step by step and new powder layers are applied. The digital information may represent a heat exchanger or other heat conducting part.

The alloy forms elongated quasi-crystalline grains that are aligned with the build direction, i.e., perpendicular to the powder layers. The cooling of the spot-melted aluminum alloy is so fast that scandium, zirconium and/or titanium may be completely or essentially or predominantly frozen in solid solution, irrespective of the other composition of the aluminum alloy and irrespective of whether the powder has been produced by normal cooling or rapid cooling, for example at a rate of 1,000,000 K/sec. After completion of the scanning process, the preliminary part is removed from the powder bed.

The preliminary part is heated to a temperature, such as in the range of 200° C. to 450° C., preferably 210° C. to 300° C. and even more preferably 225° C. to 275° C., at which precipitation of various Al3X phases (X=Ni, Sc, Zr or any non-stoichiometric mixture of the individual elements) occurs. The precipitation of these phases increases the strength of the part but happens in a manner that has only minor influence on electron and phonon migration.

The invention relates to an alloy comprising aluminum, nickel, scandium and optionally one, two or more further metals. The aluminum alloy is suitable for additive manufacturing of lightweight highly thermally conductive components for aircraft, such as heat exchangers. In a first step, a powder of the aluminum alloy according to the invention is produced by additive manufacturing, such as laser melting in the L-PBF process. Large grains are able to grow epitaxially along the build direction thereby increasing phonon and electron mobility along the build direction. With this, a higher thermal conductivity can be achieved. In a second step, the preliminary part is hardened by precipitation of secondary phases at 250 to 400 C to form the hardened part. 3D-printed lightweight parts with high thermal conductivity are obtained.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aluminum alloy comprising:
   nickel with a proportion from 2.1 wt % to 5.5 wt %;
   balance aluminum, and unavoidable impurities with a total of less than 0.5 wt %; and
   scandium with a proportion from 0.1 wt % to 3.0 wt %;
   optionally at least one first additional alloy element that is suitable to complement or to substitute scandium, wherein an individual proportion of an individual first additional alloy element does not exceed 2.0 wt % and a total proportion of the at least one first additional alloy element does not exceed 3.0 wt %;

optionally at least one second additional alloy element that is selected from a group consisting of vanadium, niobium, chromium, molybdenum, silicon, iron, and cobalt, wherein an individual proportion of an individual second additional alloy element does not exceed 2.0 wt %, and a total proportion of the at least one second additional alloy elements does not exceed 3.0 wt %;

optionally at least one third additional alloy element that is selected from a group consisting of magnesium, manganese, and calcium, wherein an individual proportion of an individual third additional alloy element does not exceed 2.0 wt % and a total proportion of the third additional alloy elements does not exceed 3.0 wt %, wherein the alloy is free of at least one of zirconium or calcium.

2. The alloy according to claim 1, wherein the nickel has a proportion from 2.6 wt % to 4.0 wt %.

3. The alloy according to claim 1, wherein the scandium has a proportion from 0.1 wt % to 1.5 wt %.

4. The alloy according to claim 1, wherein the scandium has a proportion from 0.1 wt % to 0.50 wt %.

5. The alloy according to claim 1, wherein the at least one first additional alloy element is selected from a group consisting of zirconium, tantalum, hafnium, Yttrium, and erbium.

6. The alloy according to claim 1, wherein the individual proportion of an individual first additional alloy element is from 0.1 wt % to 1.0 wt %.

7. The alloy according to claim 1, wherein the individual proportion of an individual first additional alloy element is from 0.1 wt % to 0.50 wt %.

8. The alloy according to claim 1, wherein the alloy is free of at least one of; titanium or magnesium.

9. The alloy according to claim 1, wherein the alloy further comprises one of:

calcium, wherein the calcium has a proportion from 0.5 wt % to 5 wt %;

chromium, wherein the chromium has a proportion from 0.2 wt % to 3 wt %; or zirconium, wherein the zirconium has a proportion from 0.1 wt % to 1 wt %.

* * * * *